United States Patent [19]
Robie

[11] 4,053,788
[45] Oct. 11, 1977

[54] ELECTRICAL ENERGIZABLE APPARATUS AND ADAPTER CONNECTOR FOR USE THEREWITH

[75] Inventor: Edward Thomas Robie, Boulder, Colo.

[73] Assignee: International Business Machines Corporation, Armonk, N.Y.

[21] Appl. No.: 713,742

[22] Filed: Aug. 11, 1976

[51] Int. Cl.[2] .......... H02J 3/00
[52] U.S. Cl. .......... 307/11; 339/153
[58] Field of Search .......... 355/133; 339/166 R, 339/154 R, 153, 97 R; 307/11, 43, 112, 113, 114, 115, 146

[56] References Cited

U.S. PATENT DOCUMENTS

| | | | |
|---|---|---|---|
| 2,742,623 | 4/1956 | Odegaard et al. | 339/154 R X |
| 3,938,068 | 2/1976 | Hagan | 339/153 |

*Primary Examiner*—Robert K. Schaefer
*Assistant Examiner*—Morris Ginsburg
*Attorney, Agent, or Firm*—Francis A. Sirr

[57] ABSTRACT

An electrophotographic copier apparatus having a plurality of 115 VAC single phase components which are connected in a balanced-load configuration to the two 115 VAC in-phase circuits of a 230 VAC power input plug. This plug is usable with a 230 VAC wall socket. When the copier is to be used in a location having only a 115 VAC wall socket, a passive electrical adapter connector is interposed between the copier's 230 VAC input plug and the 115 VAC wall socket. The adapter presents two in-phase 115 VAC circuits to the 230 VAC input plug. This adapter connector is stored within the copier's housing, such that the copier is readily usable with either an industry-standard 230 VAC or an industry-standard 115 VAC environment.

8 Claims, 5 Drawing Figures

ELECTRICAL ENERGIZABLE APPARATUS AND ADAPTER CONNECTOR FOR USE THEREWITH

BACKGROUND AND SUMMARY OF THE INVENTION

This invention relates to the field of electrical connectors, and more particularly to multiple insulated path connectors which comprise a coupling member interposed between a coupling wall socket and an appliance-carried plug.

In the field of office copiers, often called convenience copiers or electrophotographic copiers, it is preferable to supply a copier which is usable with the customer's existing electrical service. Normally, it is found that this service comprises either a high voltage 230 VAC service, or low voltage 115 VAC service, or perhaps, but not usually, both services with a given room.

Thus, it has been the industry practice to manufacture copiers with different voltage ratings, or to manufacture copiers such that the effective voltage rating can be changed in the field, as by rewiring, etc. This, of course, requires an undersirable inventory of parts, and undesirable labor cost to rework the copier. If this is not done, the customer may find it necessary to rewire his location in order to use a given copier.

The present invention offers a unique solution to this problem by the construction of the copier such that its various electrically energizable components are all of the single-phase, lower voltage rating. These components are then divided among two lower voltage circuits, such that a substantially balanced amperage load exists in each circuit. Each circuit is now connected to an industry-standard high voltage input plug such that when this plug is inserted into an industry-standard high voltage wall socket, each of said two lower voltage circuits receives the rated single-phase lower voltage.

In the alternative, should one desire to use this copier in an environment where such a high voltage wall socket is not available, then it is necessary to merely remove the above-mentioned passive adapter connector from its storage compartment within the copier, and to interpose this adapter between the high voltage input plug and the available lower voltage wall socket.

The construction and arrangement of this adapter connector is such that the copier's two individual lower voltage circuits are connected to receive their rated voltage from the lower voltage wall socket.

The term passive adapter connector is defined as an adapter connector whose electrical circuit elements comprise only electrical conductors representing a direct connection, as distinguished from an active adapter connector whose circuit elements include means which, for example, function to convert or transfer a voltage source of one magnitude to that of a different magnitude.

While the present invention will be described in the environment of 115 VAC and 230 VAC electrical service, the present invention more generically applies to a low voltage supply, and a high voltage supply, the high voltage supply comprising two circuits, each of a voltage magnitude substantially equal to that of the low voltage supply.

The foregoing and other features and advantages of the invention will be apparent from the following more particular description of preferred embodiments of the invention, as illustrated in the accompanying drawing.

DESCRIPTION OF THE PREFERRED EMBODIMENT

Figure 1:
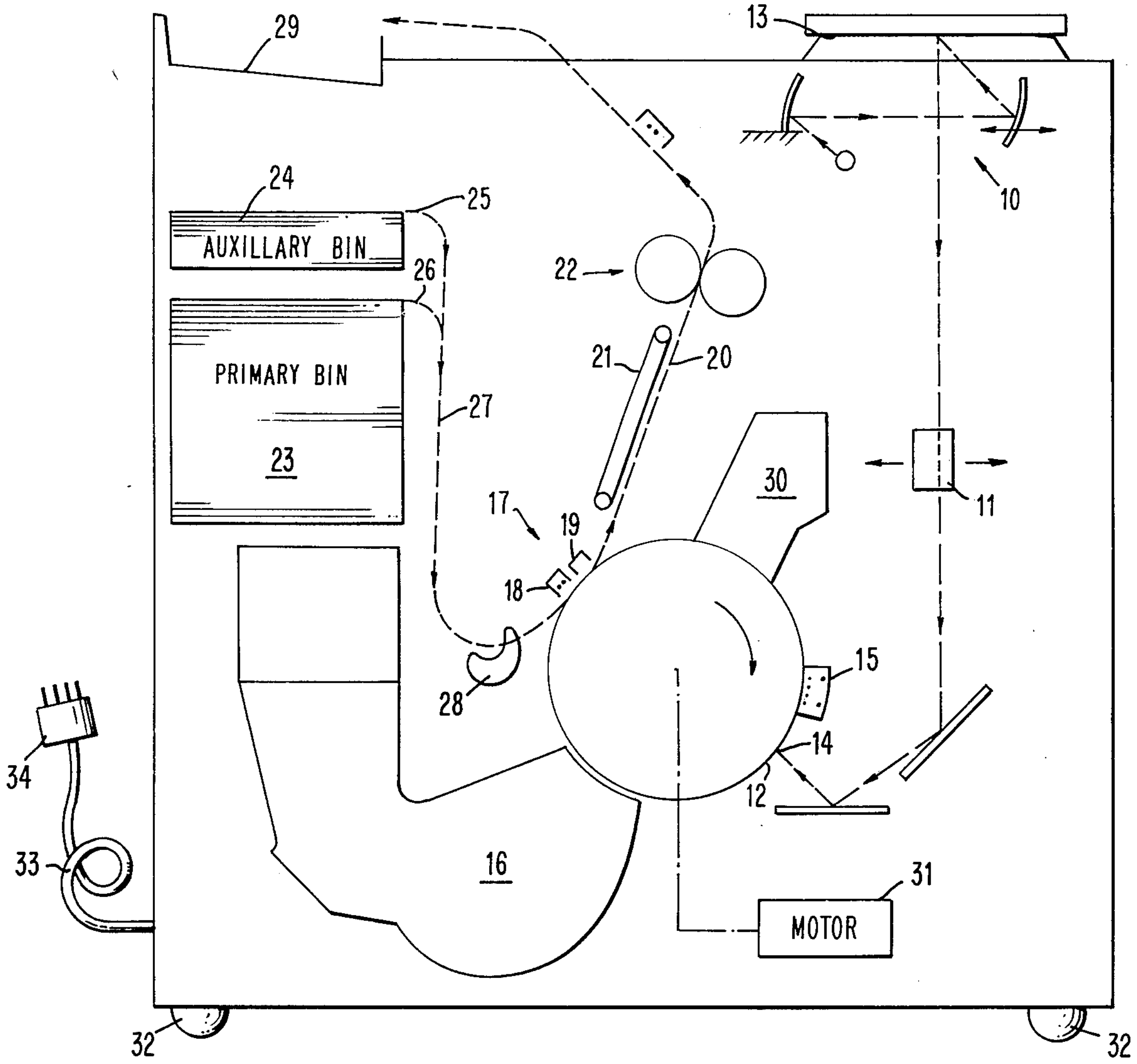
FIG. 1 is a schematic showing of a xerographic copier embodying the present invention.

FIG. 1 is a schematic view of a multiple paper bin xerographic copier incorporating the present invention. In this copier a scanning mirror system 10 and a moving lens 11 operate in synchronism with the rotation of photoconductor drum 12 to place a latent electrostatic image of an original document 13 onto the drum's surface. As is well known, prior to imaging at 14 the drum is charged by corona 15. After imaging, the drum's latent image is developed by magnetic brush developer 16. Thereafter the drum's toned visible image is transferred to a sheet of copy paper at transfer station 17. This transfer station includes transfer corona 18. Sheet detach means 19 thereafter operates to cause the leading edge of the now toned sheet to leave the surface of the drum and to follow sheet path 20, adjacent vacuum conveyor 21 on its way to single-phase, 115-VAC hot roll fuser assembly 22. After fusing, the finished copy sheet is deposited in tray 29. After transfer, the drum is cleaned as it passes cleaning station 30.

The copier of FIG. 1 includes two copy sheet supply bins 23 and 24. Primary bin 23 contains cut sheet stock of the type, i.e., size and/or weight, normally selected for use. Auxiliary bin 24 contains cut sheet stock of the type which is infrequently used.

Supply bins 23 and 24 include a bidirectional vertically movable elevator which supports the bottom sheet of the stack. Operator select means such as, for example, push buttons not shown, are actuated to select one or the other of bins 23 and 24. Sheet feeding mechanisms within the selected bin are operable to feed the top sheet of the stack to sheet discharge path 26 or 26. This sheet then travels down sheet path 27 to be momentarily stopped at sheet registration gate 28. When the leading edge of the drum's toned image arrives at the vicinity of the gate, the gate is opened to allow the sheet's leading edge to progress into transfer station 17 in exact registry with the drum's image.

The various components of the FIG. 1 copier are well known, and will not be described in detail.

The motive power for drum rotation and sheet transport is supplied by 115 VAC single-phase motor 31. The various well known electrically energizable devices of this copier are selected to have a rating of 115 volts AC single-phase, since this is a common industry-stardard wall socket to be found in many locations whereat the copier would be used. The copier's electrically energizable devices are connected across two two-wire 115 VAC single-phase circuits, not shown in FIG. 1. This grouping of devices is such that each of these two-wire circuits carries substantially the same current, that is, the two circuits are current-load-balanced. For example, motor 31 is placed in one circuit, and fuser 22 is placed in the other circuit.

The copier is mounted on castors 32 such that it is conveniently moved from one location to another. Unfortunately, one location may provide 115 VAC single-phase service, and another may provide 230 VAC service.

Input power to the copier is supplied by cord 33. This cord is a four-wire cord which carries a ground wire connected to the copier frame, a neutral wire, and two phase or hot wires. One of the phase wires and the neutral wire are connected to form the two above-mentioned balanced circuits, whereas the other phase wire and the neutral wire are connected to form the other of the two above-mentioned balanced circuits.

Cord 33 terminates at industry standard four-wire, 230 volt AC plug 34. Should the customer's electrical service be 230 VAC, plug 34 is directly inserted into the 230 VAC wall socket, and yet the copier's various 115 VAC devices are supplied their rated voltage. On the other hand, should the customer's electrical service be 115 VAC, then the above-mentioned adapter connector is taken from its storage compartment within the copier (not shown), and is interposed between plug 34 and the user's 115 VAC wall socket.

Thus, by the simple expedients of (1) selecting copier components of a 115 VAC rating, (2) dividing these components into two load-balanced circuits, (3) connecting these two circuits individually to the 115 VAC in-phase circuits of a 230 VAC power cord, and (4) providing a passive adapter connector, a copier is provided which is readily usable with either of the two most likely to be encountered electrical services.

Figure 2:
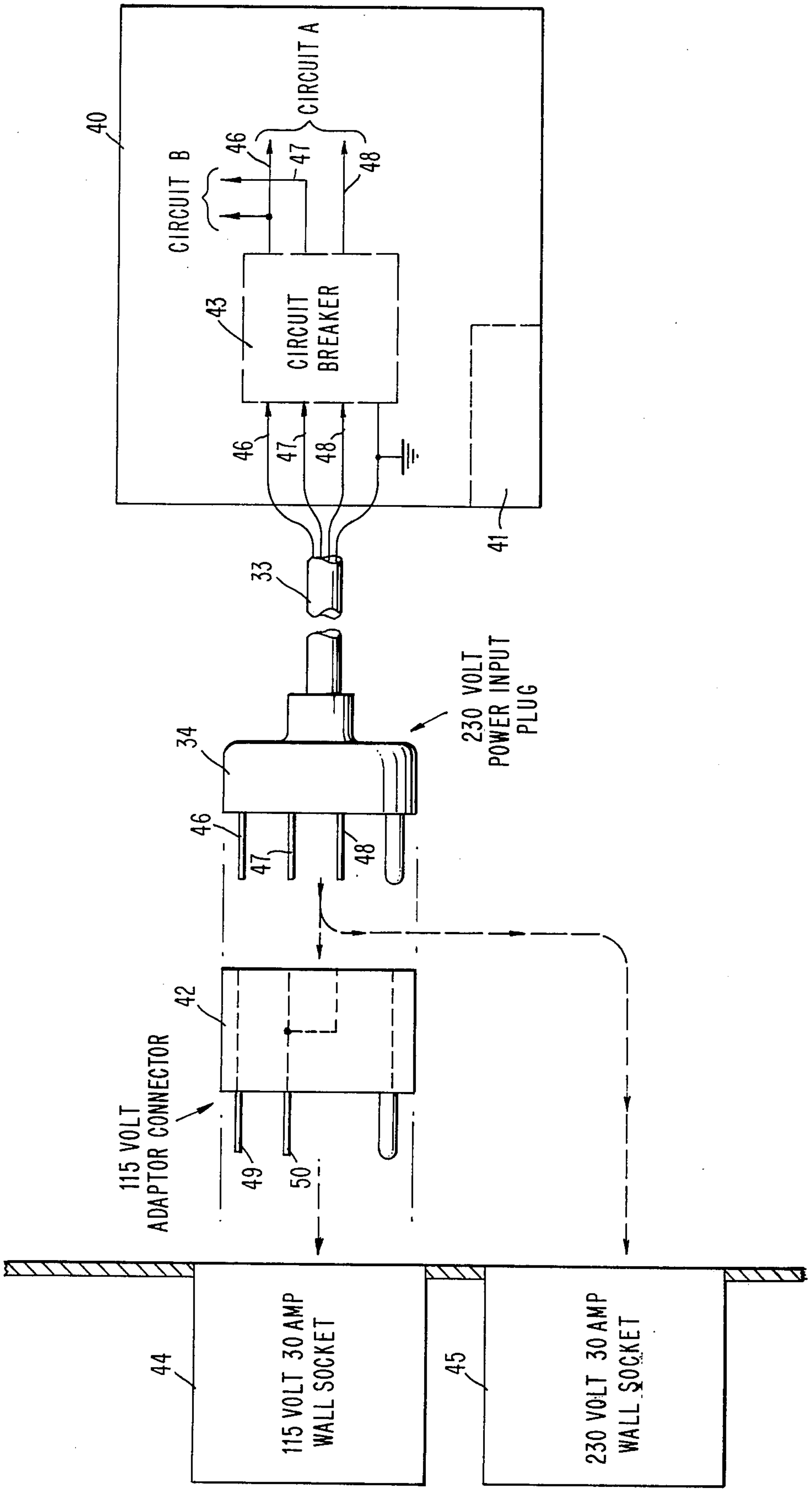
FIG. 2 is another showing of the present invention.

FIG. 2 shows the circuitry above described. Copier 40 is shown as including a storage compartment 41 which houses passive adapter connector 42. This adapter connector allows copier 40 to be selectively powered from one of two different industry-standard voltage/amperage circuits.

Copier 40 includes a circuit breaker 43 out of which three conductors extend to define the two above-mentioned circuits, namely circuit A and circuit B, which supply electrical power to the various 115 VAC copier components, not shown. Each of these circuits is, for example, a 115 volt AC, 30 amp circuit.

Copier 40 is intended for use in buildings and rooms having either an industry-standard 115 volt AC, amp wall socket 44, or an industry-standard 230 volt AC, amp wall socket 45—but usually not both sockets.

When copier 40 is used with socket 45, plug 34 is inserted directly into socket 45. In this manner, neutral conductor 46 and phase conductors 47 and 48 supply 115 volts, 30 amps to circuits A and B. As can be seen, neutral conductor 46 is common to these two circuits.

When copier 40 is used with socket 44, connector 42 is interposed between plug 34 and socket 44. The internal passive circuit connections of adaptor 42, shown dotted, are such that neutral conductor 49 connects to the neutral conductor 46 of plug 34. Phase conductor 50 connects to both of plug 34's phase conductors 47 and 48. Thus, copier 40's circuit A, i.e. conductors 46 and 48, receives 115 volt AC service from socket 44, and copier 40's circuit B, i.e. conductors 46 and 47, likewise receives 115 volt AC service from socket 44.

To simplify installation in a different environment, copier 40 is manufactured to include storage compartment 41 which is used to store connector 42 when it or the copier is not in use. Thus, copier 40 can easily be moved from one building or room to another, with the assurance that the copier can be readily plugged-in, independent of the type electrical service 44 or 45 available at the new location.

Figure 3:
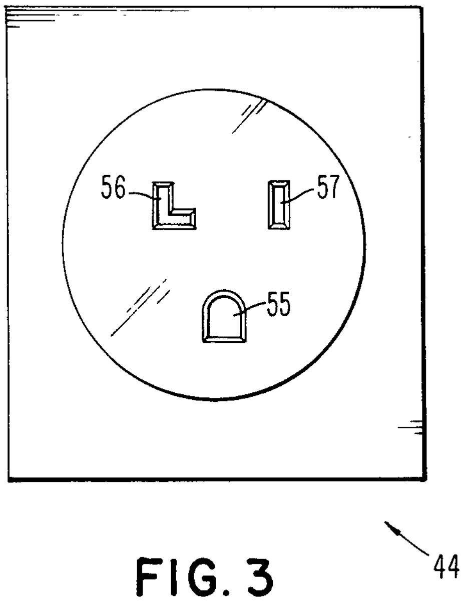
FIG. 3 is a front view of an industry-standard 115 VAC 30 AMP wall outlet.
Figure 4:
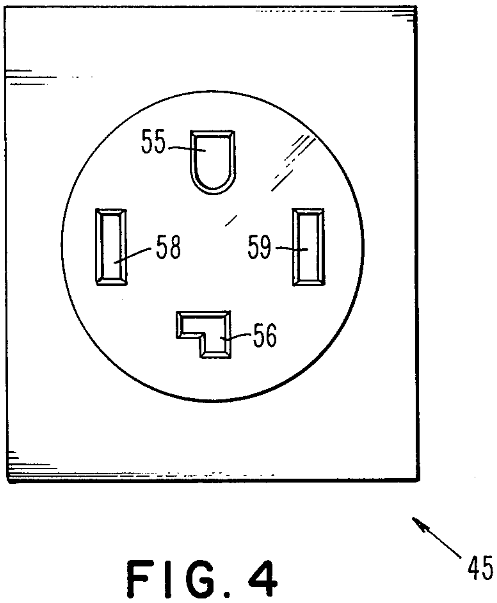
FIG. 4 is a front view of an industry-standard 230 VAC 30 AMP wall outlet.

FIGS. 3 and 4 disclose front view of FIG. 2's wall sockets 44 and 45, respectively.

Each of these sockets includes a socket 55 connected to ground. Each socket also includes a socket 56 which is the neutral power line, also connected to ground. Socket 44 includes a socket 57 which is at a potential 115 VAC above ground. Socket 45 includes two sockets 58 and 59, both of which are at a potential 115 VAC above ground. The electrical phase relationship of socket 45's circuit 58, 56 is in-phase with circuit 56, 59. Thus, the potential difference between sockets 58 and 59 is 230 VAC.

Figure 5:
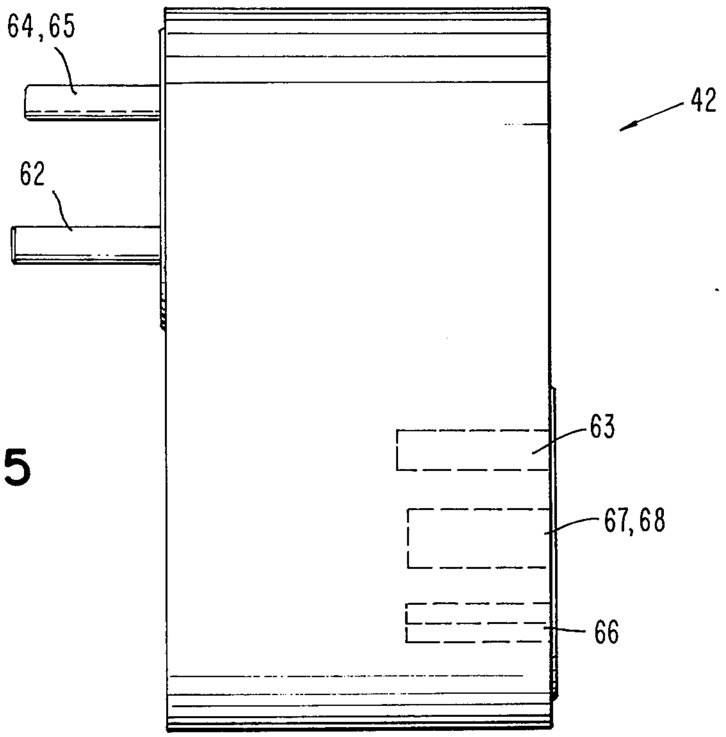
FIG. 5 is a side view of the adapter connector of this invention which includes a 230 VAC female socket configuration and a 115 VAC male plug configuration

FIG. 5 is a side view of FIG. 2's passive adapter connector 42. The right hand wall of this adapter includes a high voltage socket configuration identical to that of FIG. 4. The adapter's left hand wall includes a low voltage plug configuration of the type which mates with the socket of FIG. 3. The internal wiring for the socket is as shown in FIG. 2. Thus, ground plug 62 directly (i.e., through only a wire) connects to ground socket 63, the forward one of the two plugs 64, 65 (plug 65 is hidden by plug 64 in the view of FIG. 5) is connected directly to socket 66, and the rear plug 65 connects directly to both of the sockets 67 and 68 (socket 68 is hidden by socket 67 in the view of FIG. 5).

While the invention has been particularly shown and described with reference to preferred embodiments thereof, it will be understood by those skilled in the art that various changes in form and details may be made therein without departing from the spirit and scope of the invention.

What is claimed is:

1. Electrical energizable apparatus, comprising:

a plurality of electrically energizable devices, each of a low voltage rating, which are operatively associated to perform a function, at least two circuit means whose totality includes said devices, each circuit means being substantially current-load-balanced, a high voltage input plug having at least two low voltage circuits individually connected to a separate one of said circuit means, such that upon insertion of said input plug into a high voltage electrical input socket, each of said devices receives its rated low voltage, and a passive adapter connector associated with said apparatus, having a high voltage socket portion cooperable with said input plug, and having a low voltage plug portion cooperable with a low voltage electrical input socket, said connector containing a branching electrical conductor circuit which connects each of said devices to its rated low voltage.

2. The apparatus of claim 1 wherein said plurality of electrical devices comprise the devices of an electrophotographic copier, said copier having an internal compartment to store said adapter connector when the copier is to be used with a high voltage electrical input socket.

3. The apparatus of claim 2 wherein the high and low voltage electrical input sockets provide AC voltage, and wherein the high voltage is three-wire difining two in-phase circuits, each circuit of which is of the low voltage magnitude, and the low voltage is two-wire, single phase.

4. The apparatus of claim 1 wherein said apparatus comprises an office copier, wherein the high and low voltage electrical input sockets provide AC voltage, and wherein the high voltage is three-wire defining two in-phase circuits, each circuit of which is of the low voltage magnitude, and the low voltage is two-wire, single phase.

5. The apparatus of claim 3 wherein said input plug provides two low voltage, two-wire, single phase circuits, having a common conductor, and wherein said adapter connector connects a low voltage, two wire, single phase input at its said low voltage plug portion, to two low voltage, two-wire single phase circuits having a common conductor, at its said high voltage socket portion.

6. The apparatus of claim 4 wherein said input plug provides two low voltage, two-wire, single phase circuits, having a common conductor, and wherein said adapter connector connects a low voltage, two wire, single phase input at its said low voltage plug portion, to two voltage, two-wire, single phase circuits having a common conductor, at its said high voltage socket portion.

7. In an electrophotographic copier having a plurality of electrically energizable devices of like AC voltage ratings, the improvement comprising:

a first and a second two-wire energizing circuit, each of said devices being connected to one of said circuits in a manner to substantially current-balance said first and second circuits, a four wire, high voltage AC power input plug, having a ground wire, and three wires defining two low voltage AC phases which are in-phase, each of said two- phases having a common neutral wire, and one phase wire, means connecting said ground wire to said copier, means connecting said first circuit to one of said two low voltage AC phases, means connecting said second circuit to the other of said two low voltage AC phases, a passive adapter connector having a four wire, high voltage socket portion adapted to cooperate with said power input plug, and having a three-wire, low voltage AC plug portion including a ground wire, a neutral wire and a phase wire, and direct circuit connections within said adapter connector connecting the neutral wire of said low voltage plug portion to the common neutral wire of said power input plug, connecting the ground wire of said low voltage plug portion to the ground wire of said power input plug, and connecting the phase wire of said low voltage plug portion to each of the phase wires of said power input plug.

8. The copier of claim 7 including, a storage compartment for use to store said adapter connector when said power input plug is to be directly used with a high voltage source of AC power.

* * * * *